United States Patent [19]

Miller

[11] 4,312,051
[45] Jan. 19, 1982

[54] DATA DISPLAY
[75] Inventor: Terry A. Miller, Bartlesville, Okla.
[73] Assignee: Phillips Petroleum Company, Bartlesville, Okla.
[21] Appl. No.: 955,902
[22] Filed: Oct. 30, 1978
[51] Int. Cl.³ .............................................. G01V 1/22
[52] U.S. Cl. ....................................... 367/68; 367/60; 367/71; 367/79
[58] Field of Search ............... 367/69, 71, 76, 60, 367/79, 33, 68; 346/33 C, 107 SC, 110 R; 340/858, 860, 861; 364/900

[56] References Cited
U.S. PATENT DOCUMENTS

| | | | |
|---|---|---|---|
| 3,293,613 | 12/1966 | Gabor | 364/900 |
| 3,333,247 | 7/1967 | Hadley et al. | 367/60 |
| 3,344,406 | 9/1967 | Vinal | 364/900 |
| 3,411,145 | 11/1968 | Cragon et al. | 367/60 |
| 3,742,289 | 6/1973 | Koeijmans | 367/71 |
| 3,763,472 | 10/1973 | Sharp | |
| 3,824,533 | 7/1974 | Adamson | 367/33 |
| 3,916,370 | 10/1975 | Neeley | 367/71 |
| 3,922,643 | 11/1975 | Poole | |
| 3,931,480 | 1/1976 | Poole | 179/84 VF |
| 3,936,611 | 2/1976 | Poole | 179/15.55 T |
| 3,942,163 | 3/1976 | Goyal | 340/173 R |
| 4,003,027 | 1/1977 | DiMatteo | 364/900 |
| 4,010,476 | 3/1977 | Elliot | 340/860 |
| 4,042,906 | 8/1977 | Ezell | 367/79 |
| 4,072,923 | 2/1978 | Siems et al. | 367/78 |
| 4,084,151 | 4/1978 | Penner | 367/60 |

OTHER PUBLICATIONS

"The CCD's Future Takes on a Bright Hue", Electronics, Armstrong, vol. 50, No. 23, pp. 65–66, Nov. 1977.
"Tough Mathematical Tasks are Child's Play for Number Cruncher", Weissberger, Electronics, vol. 50, No. 4, pp. 102–107, Feb. 77.

Primary Examiner—Howard A. Birmiel

[57] ABSTRACT

Sample and hold circuits are utilized to divide data stored in memory into a plurality of channels for display. First-in-first-out buffers are utilized to compensate for the difference between the time required to read data from a memory and the time required for a sample and hold circuit to sample and hold the data.

8 Claims, 9 Drawing Figures

DATA DISPLAY

This invention relates to method and apparatus for displaying data. In a particular aspect this invention relates to method and apparatus for displaying data which has been stored in a memory. In another particular aspect this invention relates to method and apparatus for using sample and hold circuits to divide data, which has been stored in memory, into a plurality of channels to be displayed. In another particular aspect this invention relates to method and apparatus for compensating for the difference between the time required to read data from a memory and the time required for a sample and hold circuit to sample and hold the data.

It is often desirable to be able to display data which has been stored in a memory. If the data is from a single source or representative of a single parameter then a single display unit can be used and the data can be read directly from the memory to the display unit for display. However, if the data has been derived from a plurality of sources and it is desired to display the data in such a manner that the source of the data can be recognized, some means must be provided for dividing the data into a plurality of channels to be displayed. It is thus an object of this invention to provide method and apparatus for using sample and hold circuits to divide data, which has been stored in memory, into a plurality of channels to be displayed.

Sample and hold circuits must sample the signal supplied to the circuit for a certain length of time before the signal can be held by the circuit. Often, the time required by the sample and hold circuit to sample and hold a signal is different from the time that is required to read that particular signal or data from a memory. It is thus another object of this invention to provide method and apparatus for compensating for the difference between the time required to read data from a memory and the time required for a sample and hold circuit to sample and hold the data.

In accordance with the present invention, method and apparatus is provided whereby data which is in a memory is read out of the memory and converted from digital form to analog form. The data in analog form is then provided to a plurality of sample and hold circuits. The number of sample and hold circuits will at least equal the number of channels or divisions of data which are present in the memory. Thus, if the data has been supplied from 72 sources there are 72 channels of data present in the memory. If it is desired to display the 72 channels separately, then at least 72 sample and hold circuits are utilized in the present invention.

Data is read from the memory by samples. Sample 1 of channel 1 is read from the memory and is supplied to a first sample and hold circuit. Then sample 1 of channel 2 is read from the memory and is supplied to a second sample and hold circuit. This is continued until the first sample of the last data channel has been read from the memory and supplied to the last sample and hold circuit. The voltage level of the first sample of each of the data channels present is thus held by a sample and hold amplifier, the output of which is connected to a recorder such as an oscillograph. In this manner the first sample of each channel is provided to a separate recorder.

After the first sample of each data channel has been read from the memory, the second sample of each data channel is read from the memory in the same manner as previously described for the first samples. The second sample is held by the sample and hold circuits and is displayed in the same manner as the first sample. This process is continued until all of the samples of all of the data channels have been read from the memory and recorded by a plurality of recording means.

Two first in first out (FIFO) registers are utilized to compensate for the difference in the time required to read data from the memory and the time required for the sample and hold circuits to sample and hold the data signals which have been converted to an analog format. All of the first samples of all of the data channels are read from the memory and are stored in a first FIFO register. Then all of the second samples of each data channel are read out to a second FIFO register. After the data, represented by the first and second samples, has been stored in the two FIFO registers, the data can be read from the first FIFO register to the sample and hold circuits. The samples are read from the first FIFO register in response to a clock signal which has a period equal to the time required by the sample and hold circuits to sample and hold a signal. After all of the first samples have been provided to a sample and hold circuits, the second samples are provided from the second FIFO register to the sample and hold circuits. At the same time all of the third samples of the available data channel will be read from the memory to the first FIFO register. In this manner, data is always available to be supplied to the sample and hold circuits and the difference between the rate at which data can be supplied to the sample and hold circuits and the rate at which data can be read from the memory is compensated for.

Other objects and advantages of the invention will be apparent from the detailed description of the invention and appended claims as well as from the detailed description of the drawings which:

FIG. 51 is a block diagram of the data display unit illustrated in FIG. 2a;

Figure 1:
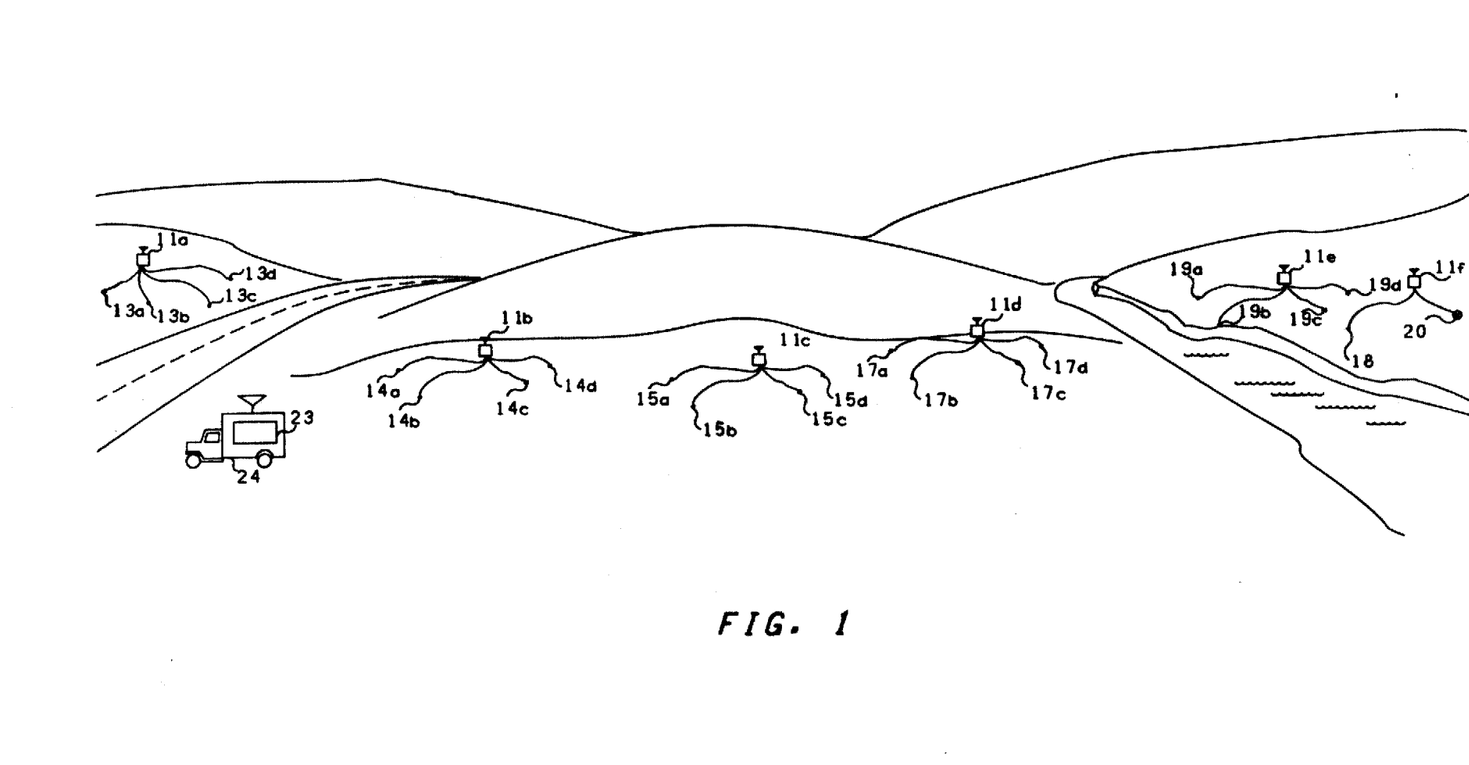
FIG. 1 is an illustration of a possible physical arrangement of the components of a seismic exploration system.
Figure 2A:
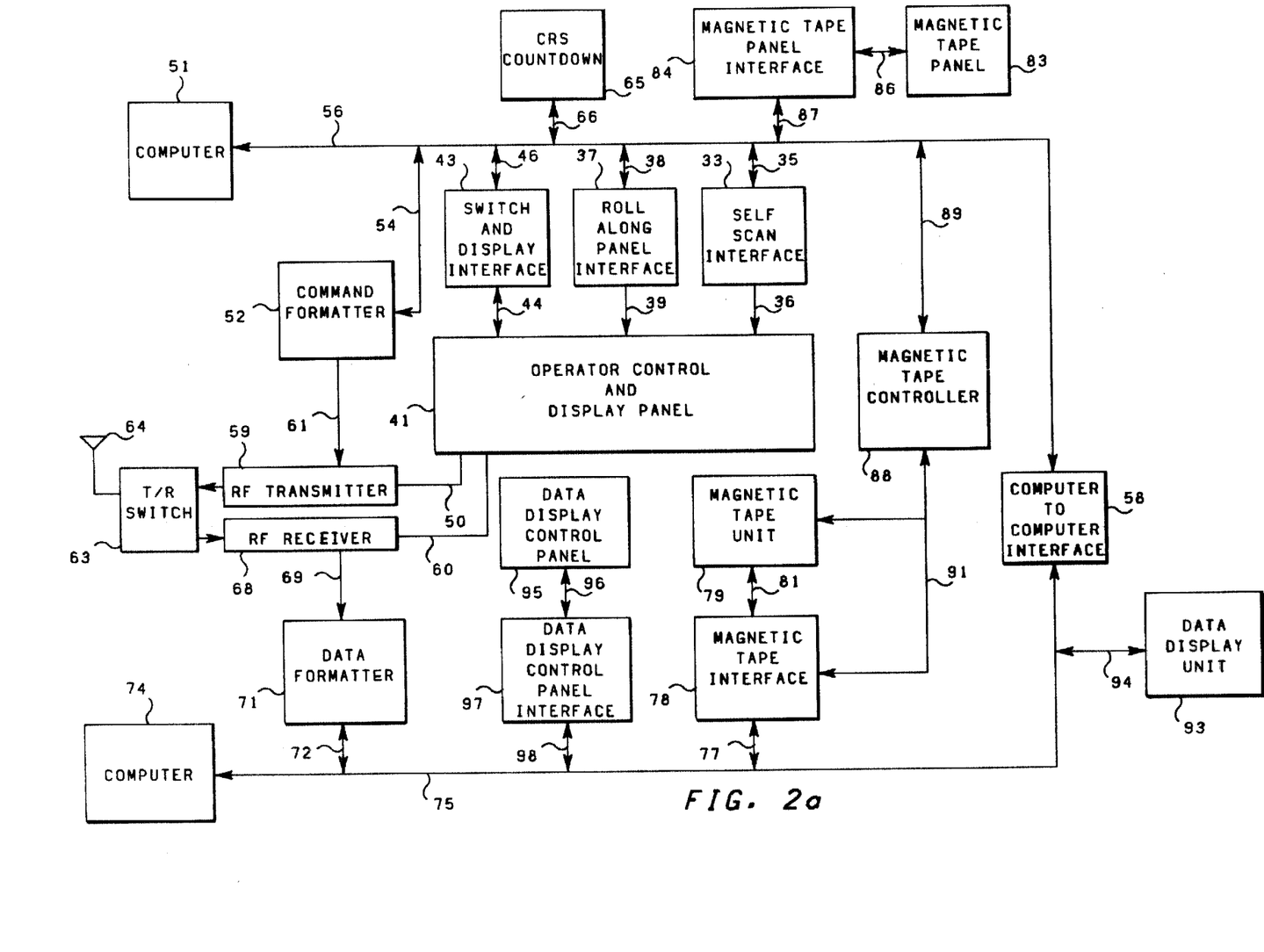
FIG. 2a is a block diagram of a central recording station.
Figure 2B:
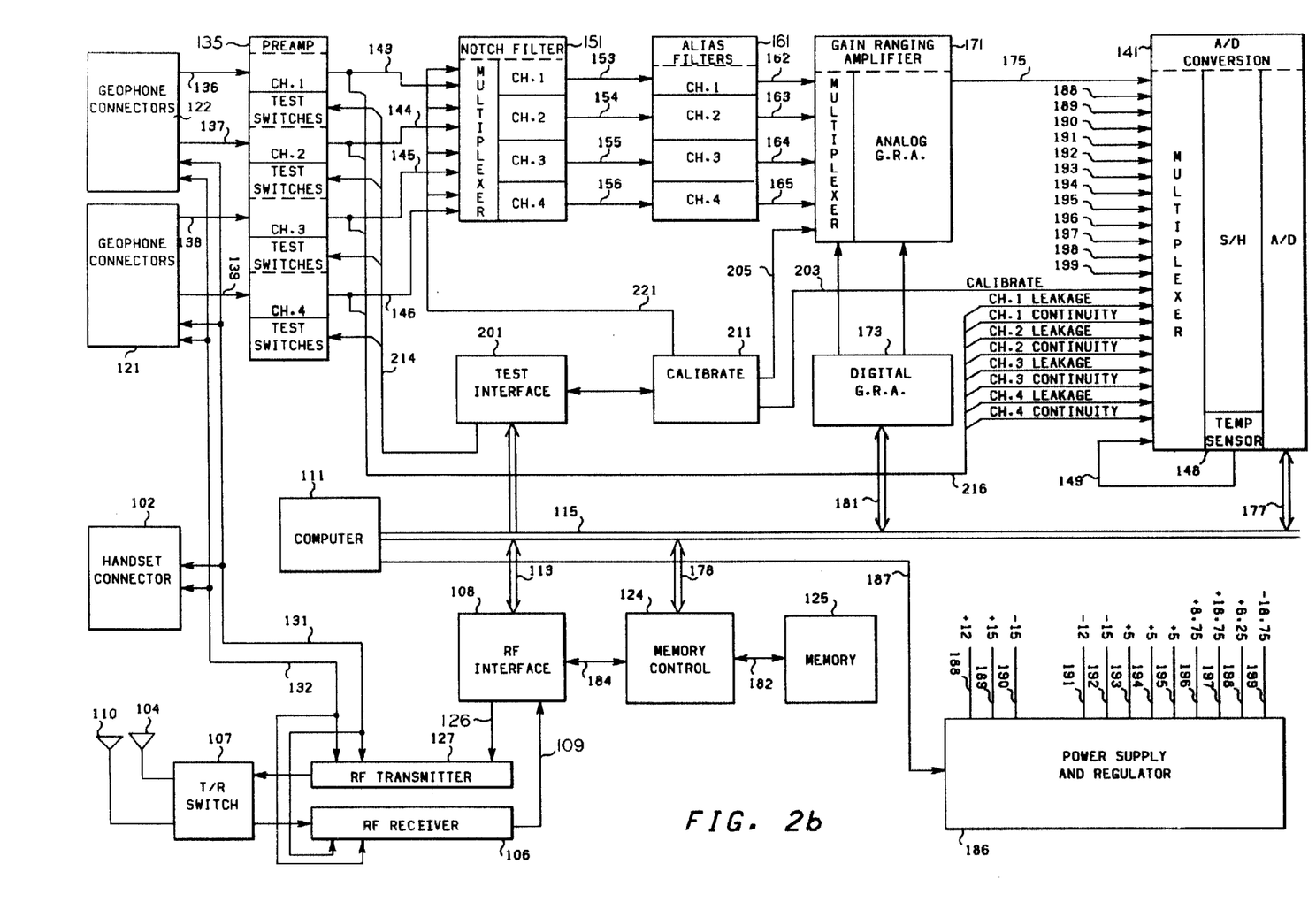
FIG. 2b is a block diagram of a remote telemetry unit.
Figure 51:
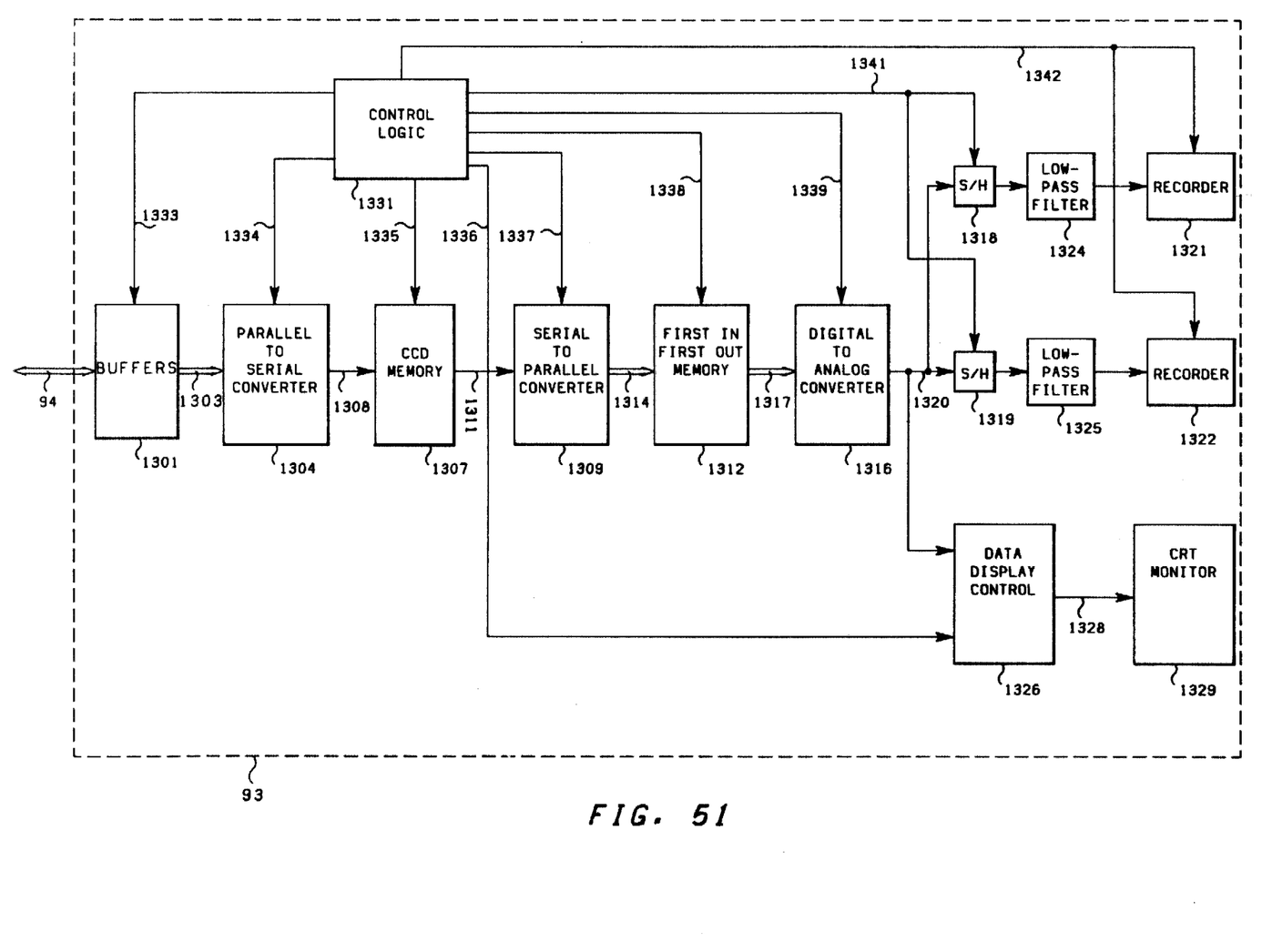
Figure 52:
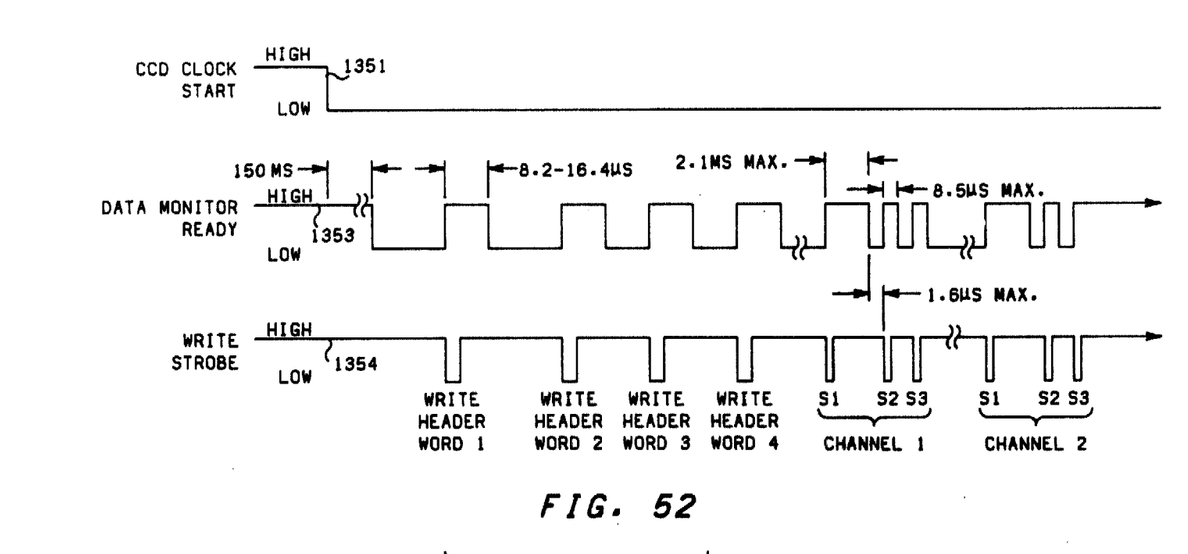
FIG. 52 is a timing diagram associated with the data display system illustrated in FIG. 51.
Figure 53:
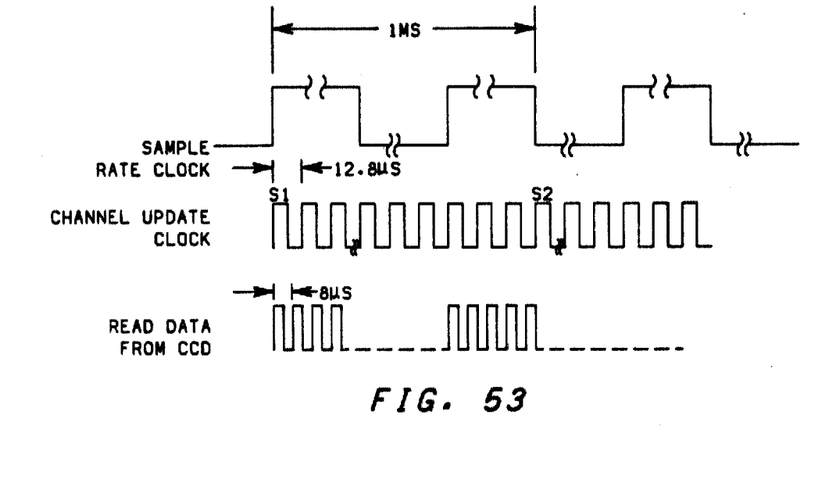
FIG. 53 is a timing diagram associated with the data display system illustrated in FIG. 51.
Figure 54:
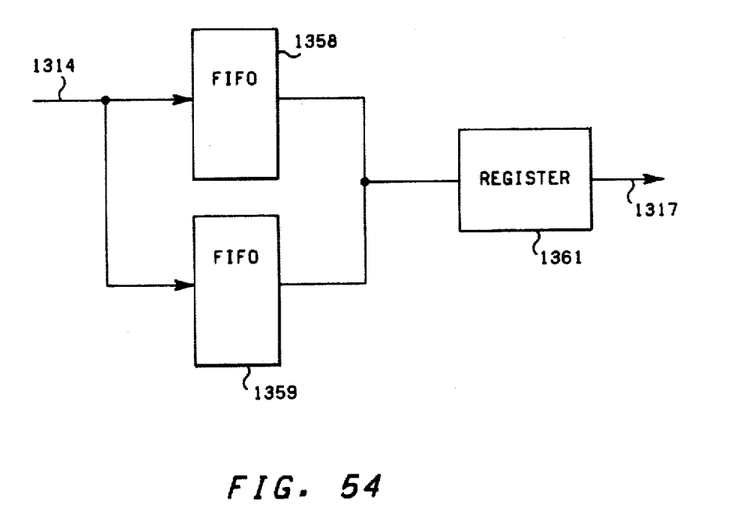
FIG. 54 is a schematic of the first-in first-out memory illustrated in FIG. 51.
Figure 55:
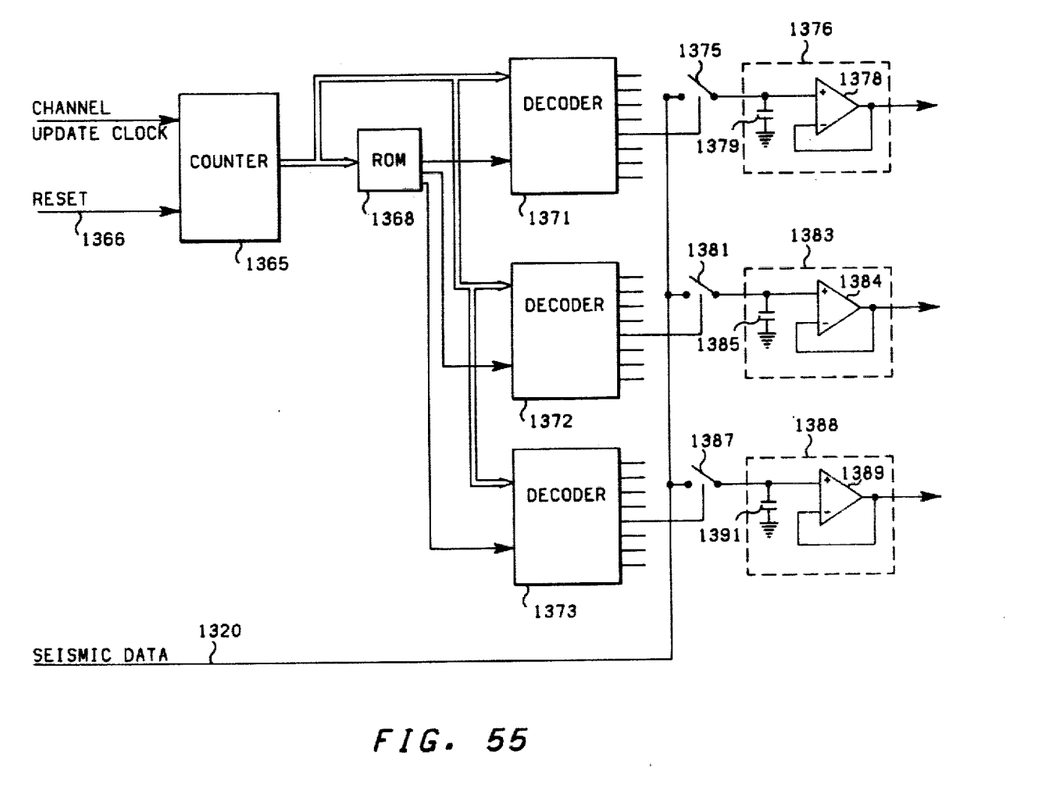
FIG. 55 is an illustration of the manner in which the sample-and-hold circuits, illustrated in FIG. 51, are addressed.
Figure 56:
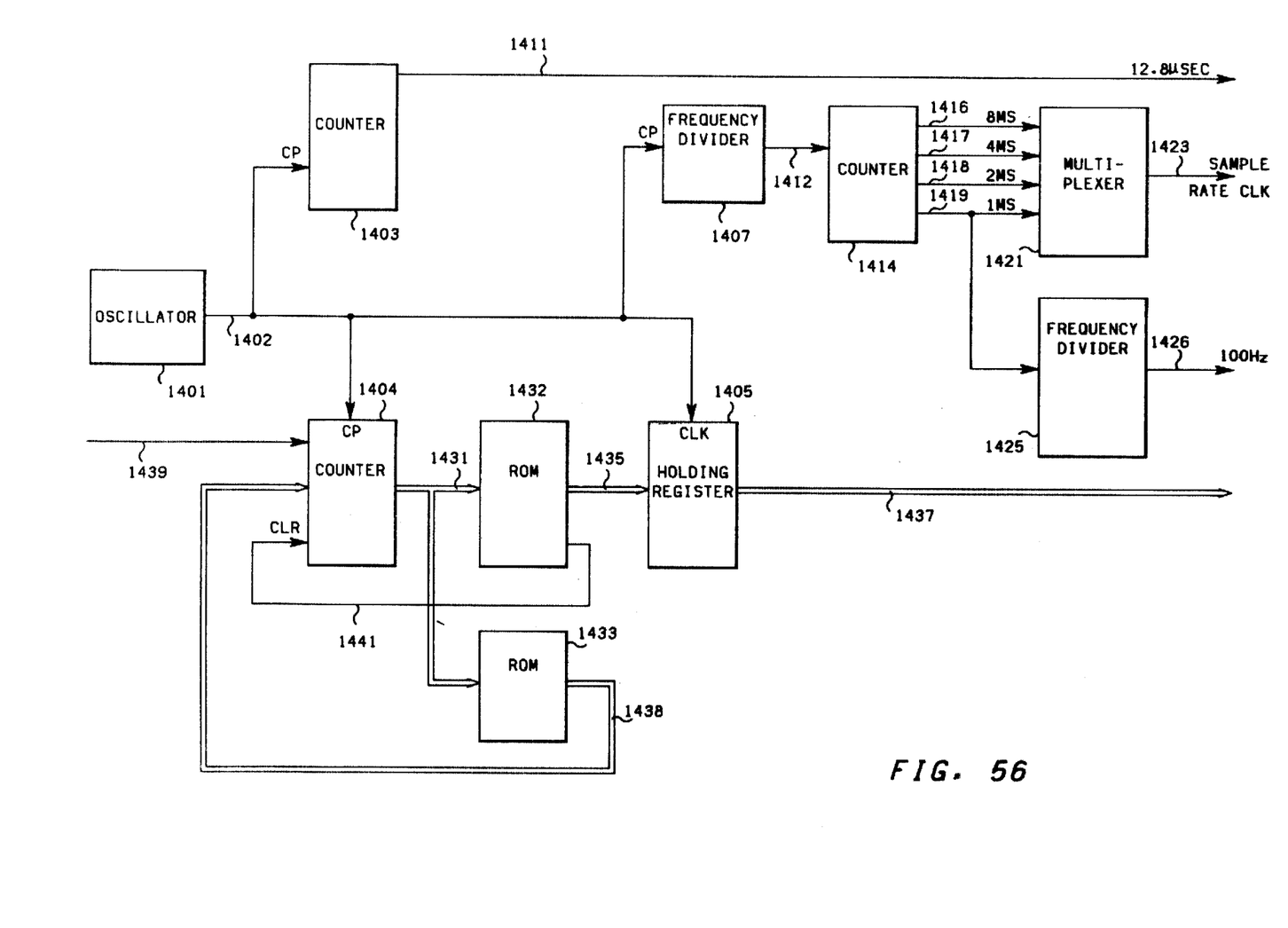
FIG. 56 is a schematic of the control logic illustrated in FIG. 51.

FIGS. 3–50 and 57–73 of application Ser. No. 955,905, filed Oct. 30, 1978, now U.S. Pat. No. 4,257,098 by Robert H. Lacy are hereby incorporated by reference. The brief description of FIGS. 3–50 and 57–73 in application Ser. No. 955,905 is also hereby incorporated by reference.

The invention is described in terms of a seismic exploration system but it is noted that the invention is not limited to a seismic exploration system but is rather applicable to any system in which it is desired to divide data which has been stored in a memory into a plurality of channels to be displayed.

In the preferred embodiment of the present invention, the memory utilized is a charge coupled device (CCD) memory. The invention, however, is not limited to CCD memories but is rather applicable to other memories such as random access memories (RAM) or read only memories (ROM).

The detailed description of the drawings and the Appendix of application Ser. No. 955,905, filed Oct. 30, 1978, now U.S. Pat. No. 4,257,098, by Robert H. Lacy, are hereby incorporated by reference.

That which is claimed is:

1. A method for performing a seismic geophysical survey wherein a central control means is utilized to control and acquire data from a plurality of remote geophone monitoring means, each of said remote geophone monitoring means being adapted to receive analog electrical signals from at least one geophone means, comprising the steps of:

activating at least one of said plurality of remote geophone monitoring means;

providing electrical signals, representative of seismic waves, from at least one of a plurality of geophone means to a respective one of each activated remote geophone monitoring means, each activated remote geophone monitoring means performing preselected data processing operations on said analog electrical signals, said preselected data processing operations comprising:

sampling said analog electrical signals; and converting the thus sampled analog electrical signals from analog form to digital form;

transmitting the sampled electrical signals, which have been converted to digital form, as seismic data to said central control means;

storing said seismic data in a memory; and displaying the seismic data from each one of the activated remote geophone monitoring means, said step of displaying the seismic data from each one of said activated remote geophone monitoring means comprising the steps of:

supplying a first sample of data, from each activated remote geophone monitoring means, from said memory to respective ones of a plurality of sample and hold circuits to thereby enable the voltage level of each first sample from each activated remote geophone monitoring means to be held by a respective one of the plurality of sample and hold circuits;

supplying each of the thus held voltage levels, which are equivalent to the voltage level of each first sample of data from each activated remote geophone monitoring means respectively, to a plurality of display means to thereby display the first sample of data from each activated remote geophone monitoring means, each sample and hold circuit having a respective one of said plurality of display means associated therewith;

supplying a second sample of data, from each activated remote geophone monitoring means, from said memory to respective ones of said plurality of sample and hold circuits to thereby enable the voltage level of each second sample of data from each activated remote geophone monitoring means to be held by a respective one of said plurality of sample and hold circuits;

supplying each of the thus held voltage levels, which are now equivalent to the voltage level of each second sample of data from each activated remote geophone monitoring means respectively, to said plurality of display means to thereby display the second sample of data from each activated remote geophone monitoring means;

continuing to supply samples of data, from each activated remote geophone monitoring means, sequentially from said memory means to respective ones of said plurality of sample and hold circuits to thereby enable the voltage level of each sample from each activated remote geophone monitoring means to be sequentially held by a respective one of said plurality of sample and hold circuits; and supplying each of the thus held voltage levels, which will be equivalent to the voltage level of the sequential samples of data from each activated remote geophone monitoring means respectively, to said plurality of display means to thereby display the samples of data from each activated remote geophone monitoring means sequentially, wherein said step of supplying samples of data from said memory to respective ones of said plurality of sample and hold circuits comprises:

reading a first sample of data, from each activated remote geophone monitoring means, out of said memory to a first register;

reading a second sample of data, from each activated remote geophone monitoring means, out of said memory to a second register;

reading the first sample of data, from each activated remote geophone monitoring means, out of said first register to a digital-to-analog conversion system to therein convert the first samples of data, from each activated remote geophone monitoring means, from digital form to analog form before the first samples, from each activated remote geophone monitoring means, are supplied to the respective ones of said plurality of sample and hold circuits;

reading the second sample of data, from each activated remote geophone monitoring means, out of said second register to said digital-to-analog conversion system after the first sample of data, from each activated remote geophone monitoring means, has been supplied to said plurality of sample and hold circuits, to therein convert the second sample of data, from each activated remote geophone monitoring means, from digital form to analog form;

supplying the second sample of data, from each activated remote geophone monitoring means, from said digital to analog conversion system to said plurality of sample and hold circuits;

reading a third sample of data, from each activated remote geophone monitoring means, out of said memory to said first register while data is being supplied from said second register to said digital-to-analog conversion system;

continuing to read samples of data, from each activated remote geophone monitoring means, out of said memory to said first and second register alternately until all of the samples of data, from each activated remote geophone monitoring means, have been read out of said memory;

continuing to supply the samples of data, from each activated remote geophone monitoring means, from said first and second registers alternately to said digital-to-analog conversion system with samples of data, from each activated remote geophone monitoring means, being read out of said memory to the one of said first and second registers which is empty as the data is being supplied from the full register to the digital-to-analog conversion system; and continuing to supply the samples of data, from each activated remote geophone monitoring means, from said digital-to-analog conversion system to said plurality of sample and hold circuits and wherein selecting the respective one of said plurality of sample and hold circuits to which it is desired to provide samples from a particular activated remote geophone monitoring means comprises the steps of:

presetting a counter to the number of activated remote geophone monitoring means; and decoding the output of said counter to thereby select a desired one of said plurality of sample and hold circuits to which it is desired to supply the samples from a particular activated remote geophone monitoring means.

2. A method in accordance with claim 1 wherein said step of selecting a desired one of said plurality of said sample and hold circuits comprises closing a switch between one of the plurality of sample and hold circuits and said digital-to-analog conversion system in response to the decoded output of said counter.

3. A method in accordance with claim 2 wherein said counter is reset after one set of data from each activated remote geophone monitoring means has been supplied from said digital-to-analog conversion system to said plurality of sample and hold circuits to thereby initialize the output of said counter to thereby always provide the output of each particular activated remote geophone monitoring means to the same one of said plurality of sample and hold circuit.

4. A method for displaying the data from a plurality of data channels, where all of the data from each of said plurality of data channels is stored in a memory, comprising the steps of:

supplying a first sample of data, from each data channel available, from said memory to respective ones of a plurality of sample and hold circuits to thereby enable the voltage level of each first sample from each data channel available to be held by a respective one of the plurality of sample and hold circuits;

supplying each of the thus held voltage levels, which are equivalent to the voltage level of each first sample of data from each data channel respectively, to a plurality of display means to thereby display the first sample of data from each of the plurality of data channels, each sample and hold circuit having a respective one of said plurality of display means associated therewith;

supplying a second sample of data, from each data channel available, from said memory to respective ones of said plurality of sample and hold circuits to thereby enable the voltage level of each second sample of data from each data channel available to be held by a respective one of said plurality of sample and hold circuits;

supplying each of the thus held voltage levels, which are now equivalent to the voltage level of each second sample of data from each data channel respectively, to said plurality of display means to thereby display the second sample of data from each of the plurality of data channels available;

continuing to supply samples of data, from each data channel available, sequentially from said memory means to respective ones of said plurality of sample and hold circuits to thereby enable the voltage level of each sample from each data channel available to be sequentially held by a respective one of said plurality of sample and hold circuits; and supplying each of the thus held voltage levels, which will be equivalent to the voltage level of the sequential samples of data from each data channel respectively, to said plurality of display means to thereby display the samples of data from each of the plurality of data channels sequentially, wherein said step of supplying samples of data from said memory to respective ones of said plurality of sample and hold circuits comprises:

reading a first sample of data, from each data channel available, out of said memory to a first register;

reading a second sample of data, from each data channel available, out of said memory to a second register;

reading the first sample of data, from each data channel available, out of said first register to a digital-to-analog conversion system to therein convert the first samples of data, from each data channel available, from a digital form to an analog form before the first samples, from each data channel available, are supplied to the respective ones of said plurality sample and hold circuits;

reading the second sample of data, from each data channel available, out of said second register to said digital-to-analog conversion system after the first sample of data, from each data channel available, has been supplied to said plurality of sample and hold circuits, to therein convert the second sample of data, from each data channel available, from digital form to analog form;

supplying the second sample of data, from each data channel available, from said digital to analog conversion system to said plurality of sample and hold circuits;

reading a third sample of data, from each data channel available, out of said memory to said first register while data is being supplied from said second register to said digital-to-analog conversion system;

continuing to read samples of data, from each data channel available, out of said memory to said first and second register alternately until all of the samples of data, from each data channel available, have been read out of said memory;

continuing to supply the samples of data, from each data channel available, from said first and second registers alternately to said digital-to-analog conversion system with samples of data, from each data channel available, being read out of said memory to the one of said first and second registers which is empty as the data is being supplied from the full register to the digital-to-analog conversion system; and continuing to supply the samples of data, from each data channel available, from said digital-to-analog conversion system to said plurality of sample and hold circuits and wherein selecting the respective one of said plurality of sample and hold circuits to which it is desired to provide samples from a particular data channel comprises the steps of:
presetting a counter to the number of data channels available; and
decoding the output of said counter to thereby select a desired one of said plurality of sample and hold circuits to which it is desired to supply the samples from a particular data channel.

5. A method in accordance with claim 4 wherein said step of selecting a desired one of said plurality of said sample and hold circuits comprises closing a switch between one of the plurality of sample and hold circuits and said digital-to-analog conversion system in response to the decoded output of said counter.

6. A method in accordance with claim 5 wherein said counter is reset after one set of data from each data channel available has been supplied from said digital-to-analog conversion system to said plurality of sample and hold circuits to thereby initialize the output of said counter to thereby always provide the output of each particular data channel available to the same one of said plurality of sample and hold circuit.

7. A seismic system for geophysical exploration comprising:
a plurality of remote geophone monitoring means, each of said remote geophone monitoring means being adapted to receive electrical signals from at least one geophone means; and
a central control means for generating electrical signals for initiating the operation of said plurality of remote geophone monitoring means;
each of said plurality of remote geophone monitoring means comprising:
means for sampling electrical signals, provided from at least one geophone means, and for converting the sampled electrical signals into digital seismic data; and
means for transmitting said digital seismic data to said central control means;
said central control means comprising:
means for receiving data from said plurality of remote geophone monitoring means;
a memory means;
means for transmitting the received data from said means for receiving data, from said plurality of remote geophone monitoring means, to said memory means;
a plurality of sample and hold circuits;
means for supplying samples of data, from said plurality of remote geophone monitoring means, from said memory means to said plurality of sample and hold circuits, each sample of data from a respective one of said plurality of remote geophone monitoring means being supplied to a respective one of said plurality of sample and hold circuits;
a plurality of display means; and
means for supplying the output of each one of said plurality of sample and hold circuits to a respective one of said plurality of display means to thereby display the samples of data from said plurality of remote geophone monitoring means separately with respect to the remote geophone monitoring means from which the sample of data was provided, wherein said means for supplying samples of data, from said plurality of remote geophone monitoring means, from said memory means to said plurality of sample and hold circuits comprises:
a first register means having an input and an output;
means for supplying samples of data from said memory means to the input of said first register means;
a second register means having an input and an output;
means for supplying samples of data from said memory means to the input of said second register means;
digital-to-analog conversion means;
means for supplying samples of data from the output of said first register means to said digital-to-analog conversion means;
means for supplying data from the output of said second register to said digital-to-analog conversion means;
means for supplying the output from said digital-to-analog conversion means to said plurality of sample and hold circuits, samples of data from said memory means being read out of said memory means alternately to said first register means and said second register means, samples of data from said first register means and said second register means being read out of said first register means and said second register means alternately to said digital-to-analog conversion means, samples of data from said memory means being read out to the one of said first register means or said second register means which is empty, while samples of data are being read, from the one of said first register means or said second register means which is full, to said digital-to-analog conversion means;
a counter means;
means for presetting said counter means to the number of said plurality of remote geophone monitoring means;
a decoder means;
means for supplying the output of said counter means to the input of said decoder means;
a plurality of switching means, each one of said plurality of switching means connecting a respective one of said plurality of sample and hold circuits to the output of said digital-to-analog conversion means; and
means for supplying a respective one of the outputs of said decoder means to a respective one of said plurality of switching means to thereby enable a respective one of said plurality of said switching means to connect the input of a respective one of said plurality of sample and hold circuits to the output of said digital-to-analog conversion means when the output of said counter means is representative of the remote geophone monitoring means, which is to be supplied to the respective one of said plurality of sample and hold circuits which has been connected to the output of said digital-to-analog conversion means by the closing of a respective one of said switching means in response to a respective one of the output signals from said decoder means.

8. Apparatus for displaying the data from a plurality of data channels, where all the data from each of said plurality of data channels is stored in a memory means comprising:
  a plurality of sample and hold circuits;
  means for supplying samples of data, from said plurality of data channels, from said memory means to said plurality of sample and hold circuits, each sample of data from a respective one of said plurality of data channels being supplied to a respective one of said plurality of sample and hold circuits;
  a plurality of display means; and
  means for supplying the output of each one of said plurality of sample and hold circuits to a respective one of said plurality of display means to thereby display the samples of data from said plurality of data channels separately with respect to the data channel from which the sample of data was provided, wherein said means for supplying samples of data, from said plurality of data channels, from said memory means to said plurality of sample and hold circuits comprises:
  a first register means having an input and an output;
  means for supplying samples of data from said memory means to the input of said first register means;
  a second register means having an input and an output;
  means for supplying samples of data from said memory means to the input of said second register means;
  digital-to-analog conversion means;
  means for supplying samples of data from the output of said first register means to said digital-to-analog conversion means;
  means for supplying data from the output of said second register to said digital-to-analog conversion means;
  means for supplying the output from said digital-to-analog conversion means to said plurality of sample and hold circuits, samples of data from said memory means being read out of said memory means alternately to said first register means and said second register means, samples of data from said first register means and said second register means being read out of said first register means and said second register means alternately to said digital-to-analog conversion means, samples of data from said memory means being read out to the one of said first register means of said second register means which is empty, while samples of data are being read, from the one of said first register means or said second register means which is full, to said digital-to-analog conversion means;
  a counter means;
  means for presetting said counter means to the number of data channels available;
  a decoder means;
  means for supplying the output of said counter means to the input of said decoder means;
  a plurality of switching means, each one of said plurality of switching means connecting a respective one of said plurality of sample and hold circuits to the output of said digital-to-analog conversion means; and
  means for supplying a respective one of the outputs of said decoder means to a respective one of said plurality of switching means to thereby enable a respective one of said plurality of said switching means to connect the input of a respective one of said plurality of sample and hold circuits to the output of said digital-to-analog conversion means when the output of said counter means is representative of the data channel, which is to be supplied to the respective one of said plurality of sample and hold circuits which has been connected to the output of said digital-to-analog conversion means by the closing of a respective one of said switching means in response to a respective one of the output signals from said decoder means.

* * * * *